(12) United States Patent
Ho et al.

(10) Patent No.: US 10,293,592 B2
(45) Date of Patent: May 21, 2019

(54) 3D COLOR PRINTING MECHANISM

(71) Applicants: XYZPRINTING, INC., New Taipei (TW); KINPO ELECTRONICS, INC., New Taipei (TW)

(72) Inventors: Ming-En Ho, New Taipei (TW); Yi-Chu Hsieh, New Taipei (TW); Chun-Hsiang Huang, New Taipei (TW); Jia-Yi Juang, New Taipei (TW); Yang-Teh Lee, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 104 days.

(21) Appl. No.: 15/365,925

(22) Filed: Nov. 30, 2016

(65) Prior Publication Data
US 2018/0117853 A1    May 3, 2018

(30) Foreign Application Priority Data

Oct. 27, 2016   (CN) .......................... 2016 1 0956810

(51) Int. Cl.
*B41M 5/00* (2006.01)
*B29C 67/00* (2017.01)
(Continued)

(52) U.S. Cl.
CPC ............ *B33Y 30/00* (2014.12); *B29C 64/106* (2017.08); *B29C 64/112* (2017.08); *B29C 64/20* (2017.08);
(Continued)

(58) Field of Classification Search
CPC ......... B29C 64/00; B29C 64/10; B29C 64/20; B29C 64/30; B33Y 10/00; B33Y 30/00;
(Continued)

(56) References Cited

U.S. PATENT DOCUMENTS

| | | | | |
|---|---|---|---|---|
| 3,924,995 | A | * 12/1975 | Crooks | ............... B29C 45/0433 425/119 |
| 8,252,223 | B2 | * 8/2012 | Medina | ............... B29C 67/0059 264/308 |

(Continued)

FOREIGN PATENT DOCUMENTS

| | | |
|---|---|---|
| CN | 104129167 A | 11/2014 |
| CN | 204076851 U | 1/2015 |

(Continued)

OTHER PUBLICATIONS

Search Report dated Jun. 19, 2017 of the corresponding European patent application No. 16202830.2.

(Continued)

*Primary Examiner* — Nahida Sultana
(74) *Attorney, Agent, or Firm* — Chun-Ming Shih; HDLS IPR Services (57) ABSTRACT

A 3D color printing mechanism includes a sliding track (100), a slider (200), a painting nozzle (300) and a modeling nozzle (400). The slider (200) is arranged on the sliding track (100) and capable of sliding between two ends of the sliding track (100). The painting nozzle (300) is arranged on the slider (200) and comprises at least one ink jet head (310). The modeling nozzle (400) is connected to the slider (200) and includes a material squeezer head (410). The material squeezer head (410) is arranged non-collinearly with the ink jet head (310) at a direction parallel to the sliding track (100).

9 Claims, 7 Drawing Sheets

(51) Int. Cl.
  *B33Y 30/00* (2015.01)
  *B41J 2/01* (2006.01)
  *B29C 64/106* (2017.01)
  *B29C 64/20* (2017.01)
  *B29C 64/112* (2017.01)
  *B29K 105/00* (2006.01)

(52) U.S. Cl.
  CPC .............. *B41J 2/01* (2013.01); *B41M 5/0047* (2013.01); *B41M 5/0064* (2013.01); *B41M 5/0088* (2013.01); *B29K 2105/0032* (2013.01)

(58) Field of Classification Search
  CPC ...... B33Y 80/00; B33Y 99/00; B41M 5/0047; B41M 5/0064; B41M 5/0088; B29K 2105/0032
  See application file for complete search history.

(56) References Cited

U.S. PATENT DOCUMENTS

| | | | |
|---|---|---|---|
| 9,764,502 B2* | 9/2017 | Chang | B29C 43/04 |
| 2004/0061752 A1* | 4/2004 | Alfekri | B41J 11/0015 |
| | | | 347/99 |
| 2006/0158456 A1* | 7/2006 | Zinniel | B33Y 30/00 |
| | | | 345/589 |
| 2006/0225834 A1* | 10/2006 | Medina | B29C 67/0059 |
| | | | 156/273.3 |
| 2006/0227194 A1 | 10/2006 | Hoshino | |
| 2007/0031603 A1* | 2/2007 | Eron | B41J 3/28 |
| | | | 427/372.2 |
| 2015/0343673 A1* | 12/2015 | Williams | B29C 39/026 |
| | | | 264/1.37 |
| 2016/0101574 A1 | 4/2016 | Mou et al. | |
| 2016/0101617 A1 | 4/2016 | Kulas | |
| 2016/0107387 A1* | 4/2016 | Ooba | B29C 67/0081 |
| | | | 264/128 |
| 2017/0028758 A1* | 2/2017 | Satou | B41M 5/0047 |
| 2017/0165908 A1* | 6/2017 | Pattinson | B33Y 10/00 |
| 2017/0246801 A1* | 8/2017 | Stodder | B33Y 30/00 |
| 2017/0266884 A1* | 9/2017 | Maeda | G05B 19/4099 |
| 2018/0117847 A1* | 5/2018 | Ohi | B29C 64/393 |
| 2018/0290382 A1* | 10/2018 | Ho | H04N 1/54 |
| 2018/0304552 A1* | 10/2018 | Lee | B29C 64/10 |

FOREIGN PATENT DOCUMENTS

| | | |
|---|---|---|
| EP | 2636510 A1 | 9/2013 |
| TW | M489766 U | 11/2014 |
| WO | 2016003277 A1 | 1/2016 |

OTHER PUBLICATIONS

Office Action dated Jun. 12, 2017 of the corresponding Taiwan patent application.

* cited by examiner

3D COLOR PRINTING MECHANISM

BACKGROUND OF THE INVENTION

Field of the Invention

The present invention is related to 3D color printing, in particular, to a 3D color printing mechanism capable of working at a large scope.

Description of Related Art

Figure 1:
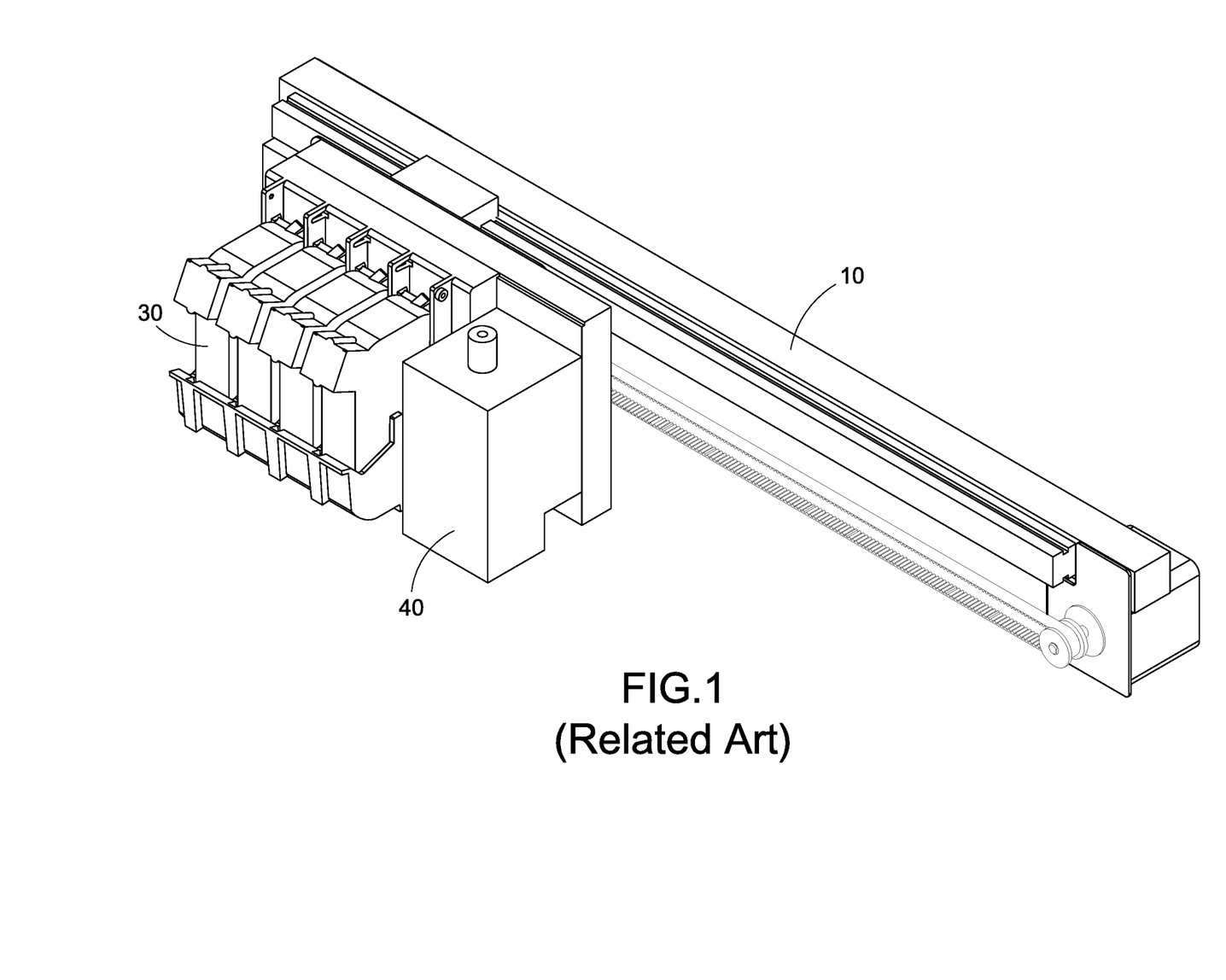
FIG. 1 is a perspective view of a known 3D color printing mechanism.
Figure 2:
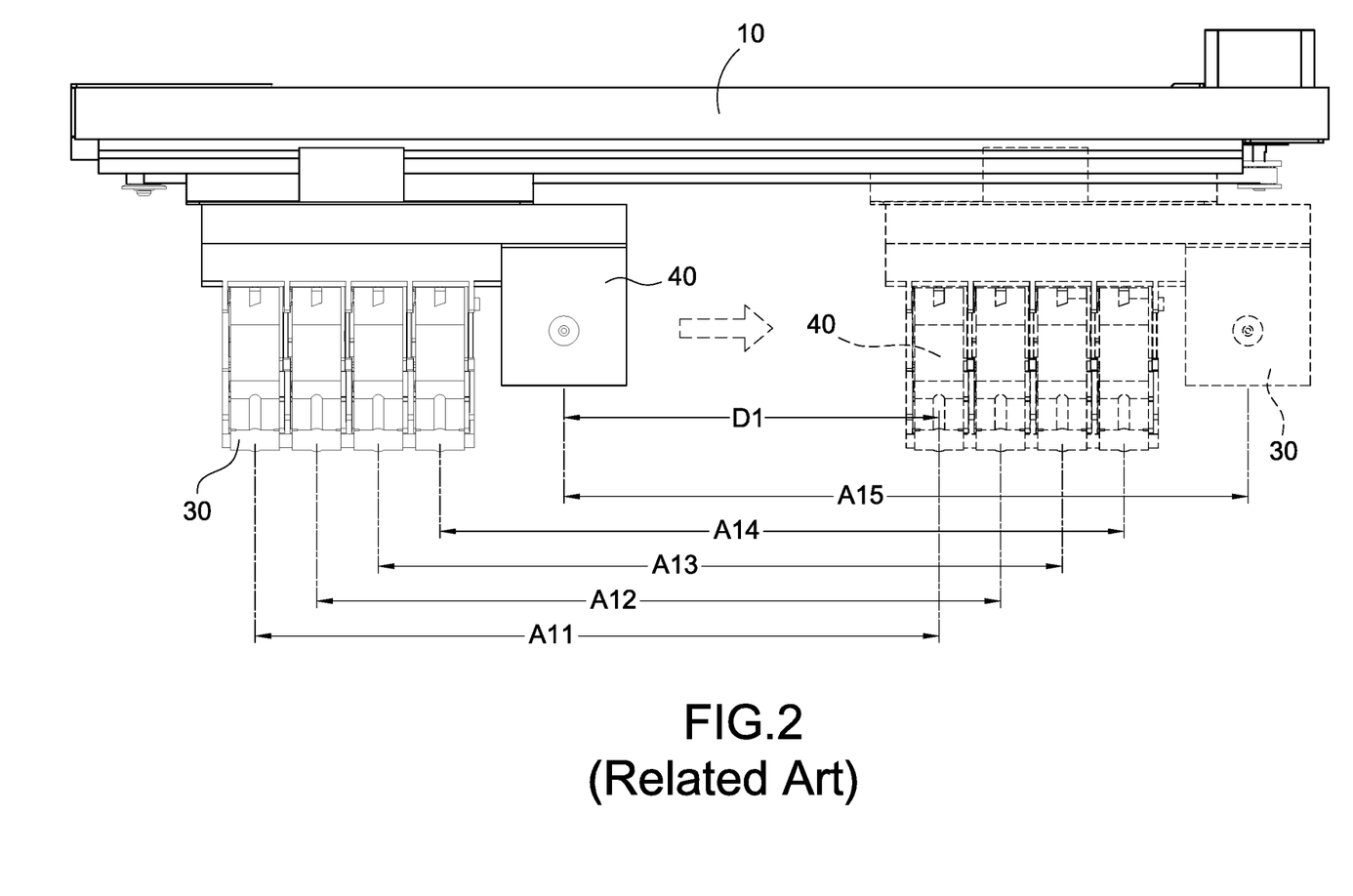
FIG. 2 is an illustration showing a working state of the known 3D color printing mechanism.

FIG. 1 and FIG. 2 show a currently existing 3D color existing printing device, comprising a sliding track 10, a plurality of painting nozzle 30 and a modeling nozzle 40. Each painting nozzle 30 is used for spraying color, and the modeling nozzle 40 is used for squeezing out the plastic material.

In general, the most common and simplest configuration method is to arrange the painting nozzle 30 and the modeling nozzle 40 on one side of the sliding track 10 in one way along the sliding track 10 such that they are able to move along the sliding track 10. The modeling nozzle is able to fuse the plastic material to squeeze the plastic material onto a modeling platform in order to deposit thereon and to cure into a finished product. The painting nozzle is able to spray pigments onto the finished product.

However, the working scope where the finished product of the modeling formed by the 3D color printing device refers the intersection area of the moving ranges (A11~A15) of all of the painting nozzles 30 and the modeling nozzles 40. Despite that each painting nozzle 30 and the modeling nozzle 40 can have relatively large moving ranges (A11~A15) respectively, nevertheless, such one-row arrangement of the painting nozzle 30 and the modeling nozzle 40 along the sliding track 10 causes the intersection area of such moving ranges (A11~A15) to be quite small. Consequently, the working scope D1 of the currently existing 3D color printing device only occupies an extremely small portion of the stroke of the sliding track 10.

In view of the drawbacks of poor usage stability and insufficient structure associated with the currently existing known art of the rotatable connector of a power adapter, it is an objective of the inventor of the present invention to provide a solution capable of overcoming the aforementioned problems through years of research along with the utilization of theoretical principles.

SUMMARY OF THE INVENTION

The present invention provides a 3D color printing mechanism having a large working scope under the condition of a predefined length of stroke of the sliding track.

The present invention provides a 3D color printing mechanism comprising a sliding track, a slider, a painting nozzle and a modeling nozzle. The slider is arranged on the sliding track and capable of moving between two ends of the sliding track. The painting nozzle is arranged on the slider, and the painting nozzle comprises at least one ink jet head. The modeling nozzle is connected to the slider, and the modeling nozzle comprises a material squeezer head. The material squeezer head is arranged non-collinearly with the ink jet head at a direction parallel to the sliding track.

For the 3D color printing mechanism of the present invention, the slider is arranged at one side of the sliding track. The ink jet head and the slider are on the same side of the sliding track. The material squeezer head is located at another side of the sliding track.

For the 3D color printing mechanism of the present invention, wherein the sliding track includes a motor arranged thereon and used for driving the slider. A transmission belt is provided between the motor and the slider.

For the 3D color printing mechanism of the present invention, a portion of the modeling nozzle is located directly underneath the sliding track. The material squeezer head is located directly underneath the sliding track. A portion of the slider extends to underneath the sliding track. The ink jet head and the material squeezer head are arranged to face toward the same direction. The modeling nozzle comprises a material inlet connected to the material squeezer head, and the material squeezer head and the material inlet are located on two opposite sides of the modeling nozzle. The painting nozzle comprises at least one ink cartridge, and the ink cartridge is connected to the corresponding ink jet head of the painting nozzle. The painting nozzle comprises a plurality of ink jet heads, and the plurality of ink jet heads are arranged in one row parallel to the sliding track, and the material squeezer head is located inside an arrangement section of the plurality of ink jet heads at a direction parallel to the sliding track. The painting nozzle comprises a plurality of ink cartridges, and each ink cartridges is connected to the corresponding ink jet head respectively. The material squeezer head is arranged lower than the ink jet head.

The 3D color printing mechanism of the present invention is able to compactly arrange the ink jet head and the material squeezer head in order to obtain a greater working scope under the condition of predefined length of stroke of the sliding track. Therefore, the 3D color printing mechanism of the present invention is able to print and model a finished product of a greater dimension.

DETAILED DESCRIPTION OF THE INVENTION

Figure 3:
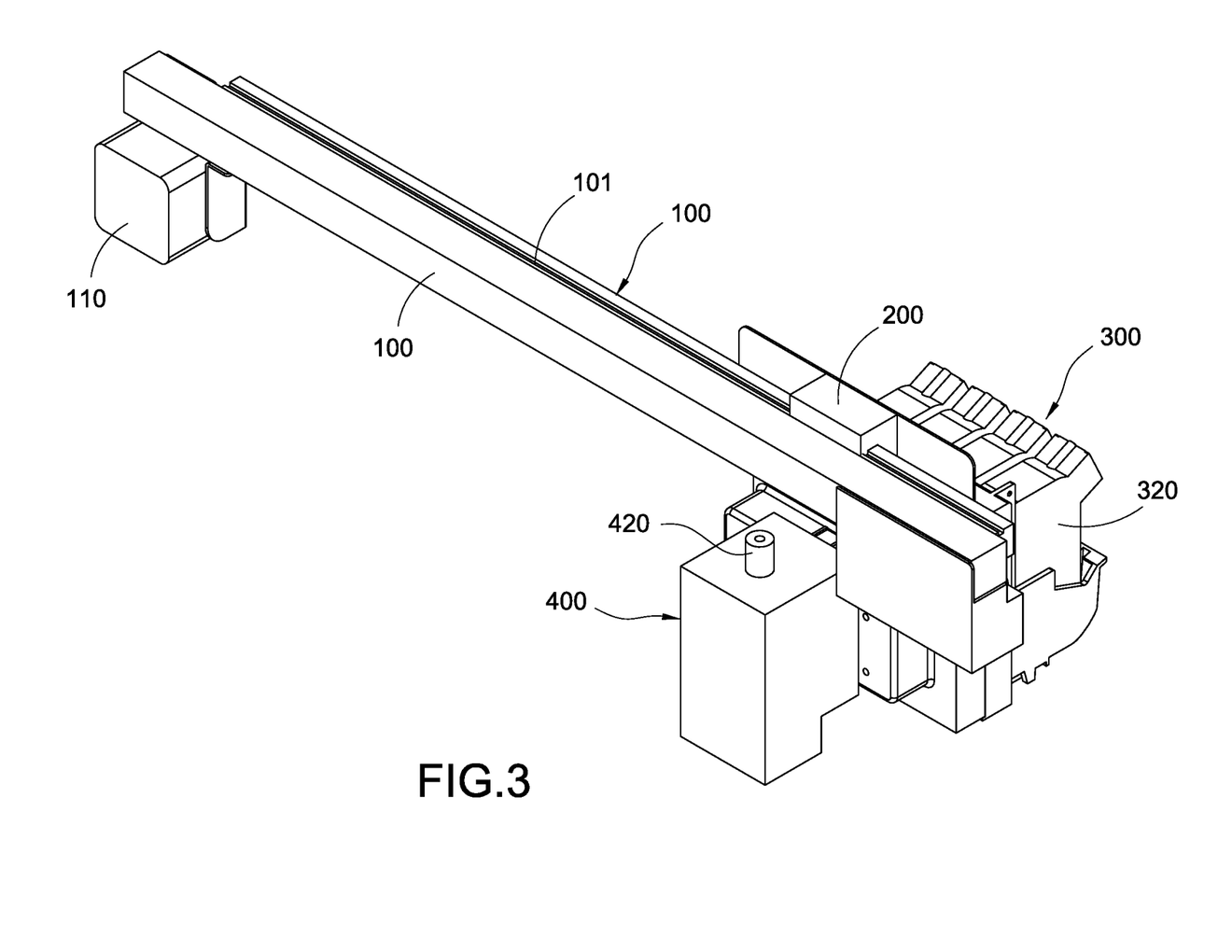
FIG. 3 is a perspective view of a 3D color printing mechanism according to a first embodiment of the present invention.
Figure 4:
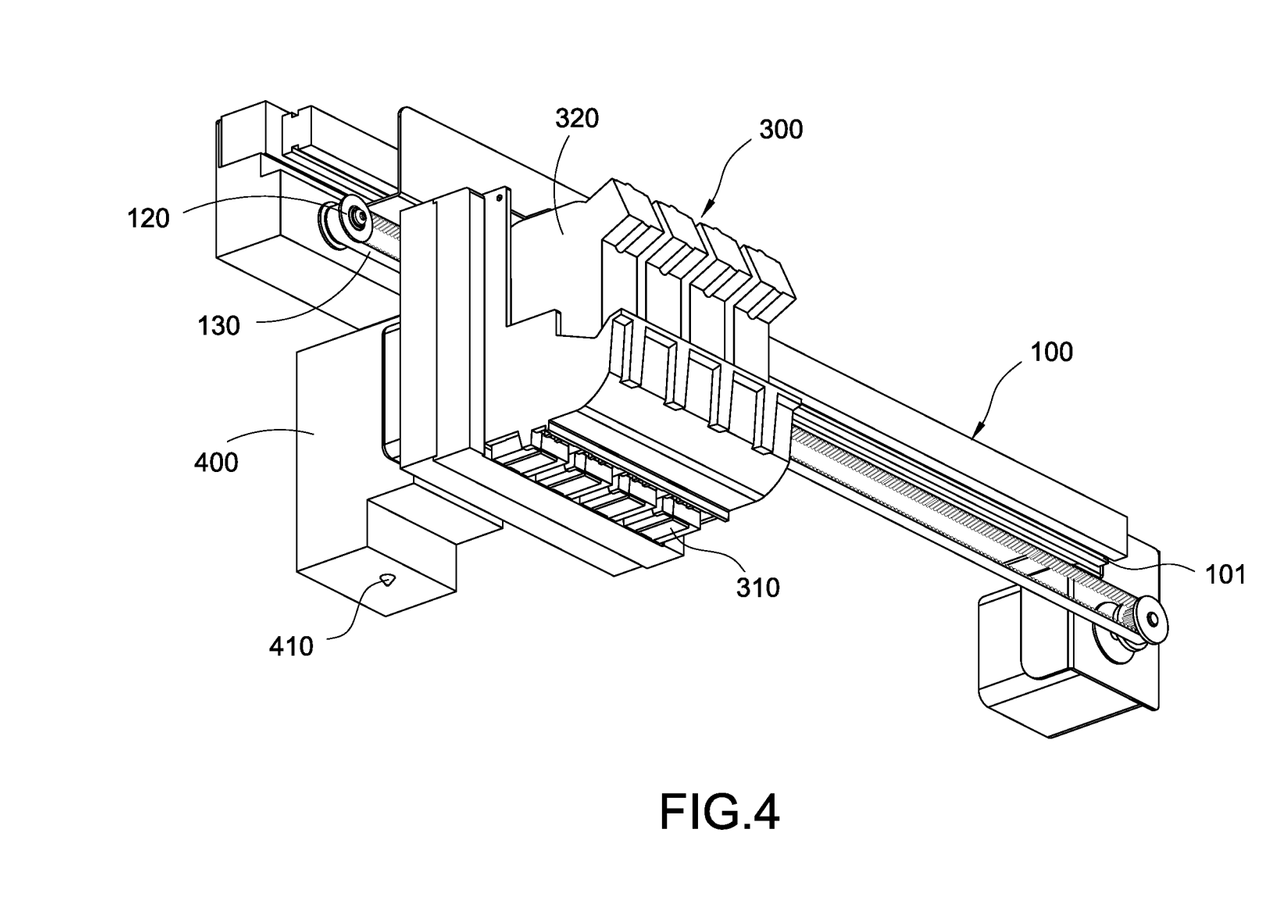
FIG. 4 is another perspective view of the 3D color printing mechanism according to the first embodiment of the present invention.
Figure 5:
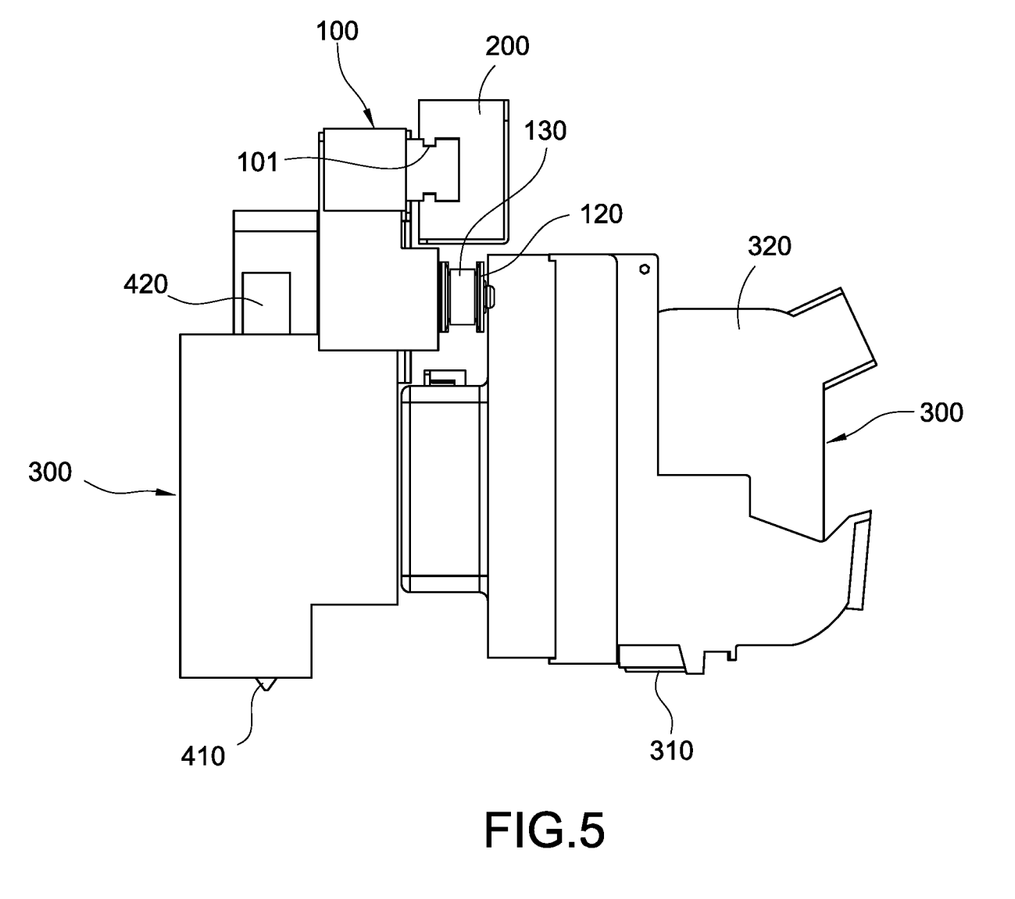
FIG. 5 is a side view of the 3D color printing mechanism according to the first embodiment of the present invention.

Please refer to FIG. 3 to FIG. 5. According to a first embodiment of the present invention, a 3D color printing mechanism comprises a sliding track 100, a slider 200, a plurality of painting nozzle 300 and a modeling nozzle 400.

In this embodiment, the sliding track 100 is preferably an elongated member made of a metal. The side wall of the sliding track 100 is formed of a sliding slot 101 extended between two ends of the sliding track 100. One end of the sliding track 100 includes a motor 110 arranged thereon, and another end of the sliding track is provided with an idler 120. A transmission belt 130 is arranged between the motor 110 and the idler 120.

The slider 200 is arranged on the sliding track 100. In this embodiment, the slider 200 is mounted on one side of the sliding track 100, and a portion of the slider 200 preferably extends to underneath the sliding track 100. The slider 200 is inserted into the sliding slot 101 such that it is able to slide between the two ends of the sliding track 100 along the sliding slot 101. The slider 200 is connected to the transmission belt 130 such that it can be driven by the motor 110 to slide.

The painting nozzle 300 is arranged on the slider 200 such that it can be driven by the slider 200. The painting nozzle 300 comprises a plurality of ink jet heads 310, and the plurality of ink jet heads 310 are configured to face downward. The plurality of ink jet heads 310 are arranged in one row parallel to the sliding track 100, and the plurality of ink jet heads 310 and the slider 200 are located on the same side of the sliding track 100. The painting nozzle 300 comprises a plurality of ink cartridges 320 corresponding to each one of the ink jet heads 310, and each ink cartridge 320 is connected to the corresponding ink jet head 310. The ink cartridges 320 are filled with pigments to be sprayed out from the ink jet heads 310, and the ink cartridges 320 are filled with pigments of different colors.

The modeling nozzle 400 is connected to the slider 200. In this embodiment, the modeling nozzle 400 is preferably mounted on another side of the sliding track 100 relative to the slider 200, and a portion of modeling nozzle 400 is located directly underneath the sliding track 100 such that it is able to cross over the lower portion of the sliding track 100 in order to connect to the slider 200. The modeling nozzle 400 comprises a material squeezer head 410 and a material inlet 420 connected to the material squeezer head 410. The material inlet 420 is used for input the plastic material filaments and the plastic material filaments are heated and fused into plastic material by the modeling nozzle 400 in order to be squeezed out by the material squeezer head. In this embodiment, the material squeezer head 410 and the material inlet 420 are preferably located on two opposite upper and lower sides of the modeling nozzle 400. The material squeezer head 410 and the plurality of ink jet heads 310 are arranged non-collinearly, and the material squeezer head 410 is located inside the arraignment section of the plurality of ink jet heads 310 at the direction parallel to the sliding track 100. In this embodiment, the material squeezer head 410 is located on another side of the sliding track 100 in order to connect with the material inlet 420 in a straight line manner in order to ensure that the plastic material filaments can be smoothly supplied from the material inlet 420 to the material squeezer head 410. However, the present invention is not limited to such configuration only such that under the premise where the plastic material filaments can be supplied smoothly, the material squeezer head 410 can also be configured to be directly underneath the sliding track 100.

The modeling nozzle 400 can be driven by the slider 200 in order to squeeze the fused plastic material onto a modeling platform for deposition thereon and cured into a finished product. The painting nozzle 300 is able to spray the pigments onto the finished product. The plastic material is squeezed downward from the material squeezer head 410 and cured for formation into shape; therefore, the material squeezer head 410 contacts directly with the finished product, whereas the ink jet heads 310 need to be maintained at a certain distance from the finished product in order to facilitate the painting. The material squeezer head 410 is preferably arranged lower than the ink jet heads 310.

Figure 6:
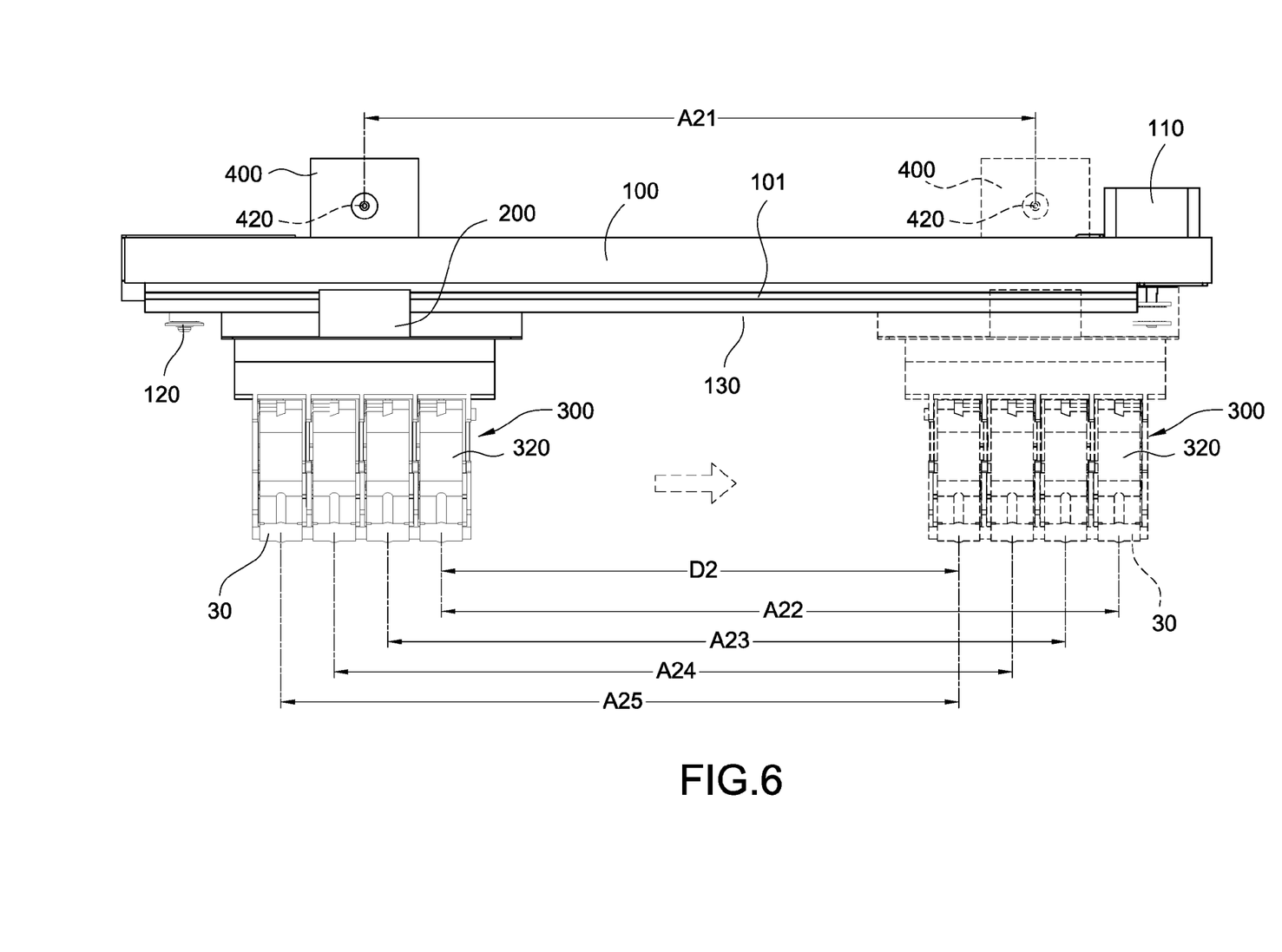
FIG. 6 is an illustration showing a working state of the 3D color printing mechanism according to the first embodiment of the present invention.

As shown in FIG. 6, the 3D color printing mechanism of the present invention has a working scope D2 formed by the intersection areas of the moving ranges (A21~A25) of the painting nozzle 300 and the modeling nozzle 400. The aforementioned configuration is able to allow the material squeezer head 410 and the ink jet heads 310 to arrange more compactly and closely at the direction parallel to the sliding track 100 such that the arrangement section between the material squeezer head 410 and the ink jet heads 310 is reduced. A comparison between the 3D color printing mechanism of the present invention and the currently existing 3D color printing device as shown in FIG. 1 and FIG. 2 shows that under the condition of the same length of stroke of the sliding track 100, the working scope D2 is approximately twice greater than the working scope D1 of the currently existing 3D color printing device. Therefore, the 3D color printing mechanism of the present invention is able to print and form a finished product of larger dimensions.

Figure 7:
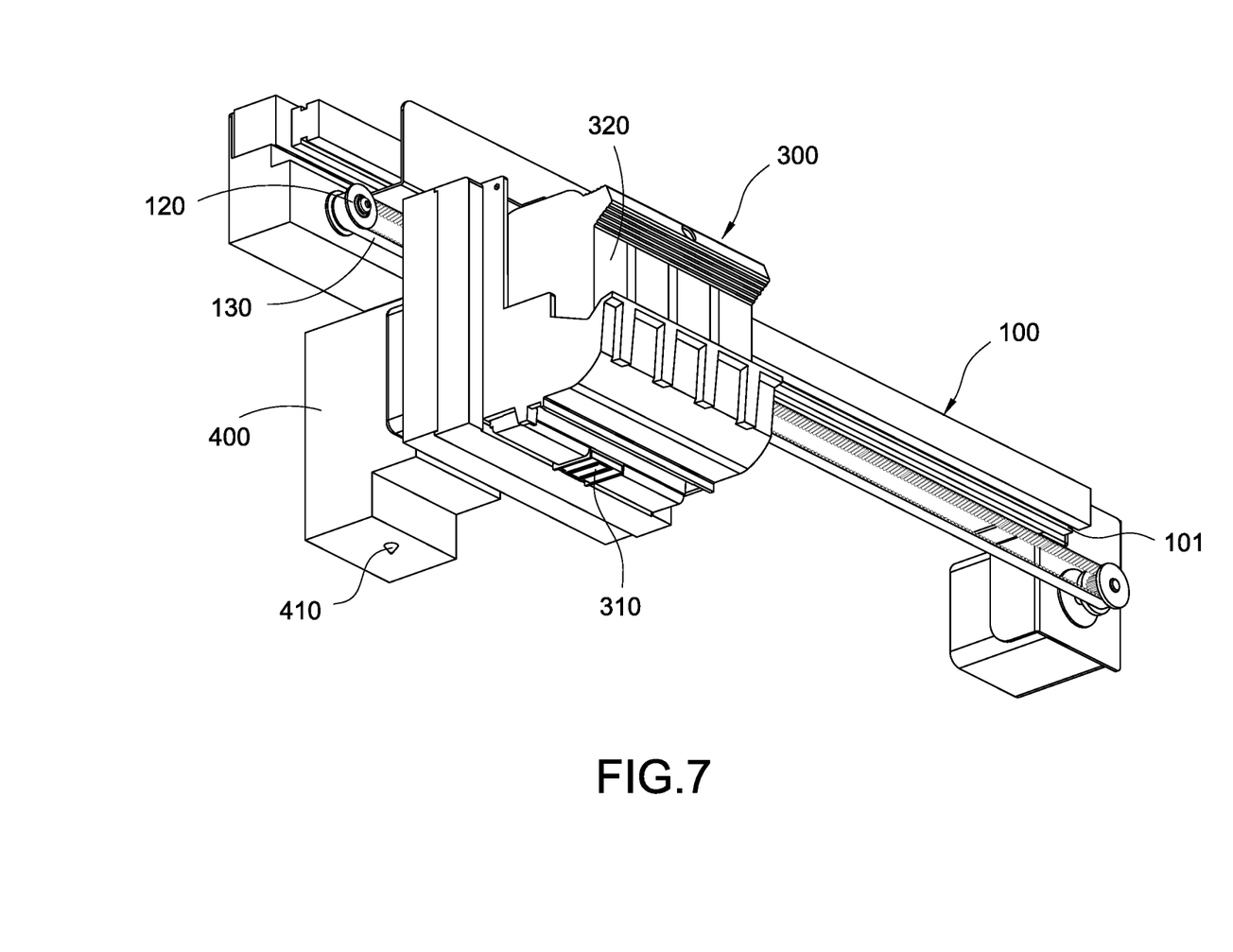
FIG. 7 is a perspective view of a 3D color printing mechanism according to a second embodiment of the present invention.

As shown in FIG. 7, according to a second embodiment of the present invention, a 3D color printing mechanism comprises a sliding track 100, a slider 200, a painting nozzle 300 and a modeling nozzle 400. The 3D color printing mechanism of the second embodiment is of a structure similar to that of the aforementioned first embodiment; therefore, the descriptions of the identical parts are omitted, and the differences between the second embodiment and the first embodiment are described in details as follows.

The painting nozzle 300 comprises a single ink jet head 310 and a plurality of ink cartridges 320, and the ink jet head 310 is configured to face downward. In addition, the ink jet head 310 and the slider 200 are arranged on the same side of the sliding track 100. Each ink cartridge 320 is connected to the ink jet head 310, and the ink cartridges 320 are filled with pigments for spraying from the ink jet head 310. In addition, the ink cartridges 320 are filled with pigments of different colors respectively.

The material squeezer head 410 is arranged non-collinearly with the ink jet head 310 at the direction parallel to the sliding track 100. The material squeezer head 410 and the ink jet head 310 are located at two sides of the sliding track 100.

The above is provided to describe the preferred embodiments of the present invention, which shall not be treated as limitations to the claims of the present invention. Other equivalent modifications utilizing the spirit of the patent of the present invention shall all be deemed to be within the scope of the claims of the present invention.

What is claimed is:
1. A 3D color printing mechanism, comprising:
    a sliding track (100) extending along a longitudinal direction;
    a slider (200) arranged on the sliding track (100) and capable of moving between two ends of the sliding track (100);
    a painting nozzle (300) arranged on the slider (200), the painting nozzle (300) comprising at least one ink jet head (310); and
    a modeling nozzle (400) connected to the slider (200), the modeling nozzle (400) comprising a material squeezer head (410), the modeling nozzle (400) arranged non-collinearly with the painting nozzle (300) along a transversal direction;

wherein the painting nozzle (300) is arranged at a first side of the slider (200) and the modeling nozzle (400) is arranged at a second side of the slider (200) opposite to the painting nozzle (300);

wherein the ink jet head (310) and the slider (200) are at the same side of the sliding track (100), and the material squeezer head (410) and the slider (200) are located at opposite sides of the sliding track (100);

wherein a portion of the modeling nozzle (400) is located directly underneath the sliding track (100), and the material squeezer head (410) is located directly underneath the sliding track (100);

wherein the modeling nozzle (400) comprises a material inlet (420) connected to the material squeezer head (410), and the material squeezer head (410) and the material inlet (420) are located on opposite sides of the modeling nozzle (400) along a vertical direction substantially perpendicular with the longitudinal direction and the transversal direction;

wherein the material squeezer head (410) is arranged lower than the ink jet head (310) along the vertical direction.

2. The 3D color printing mechanism according to claim 1, wherein the slider (200) is arranged at one side of the sliding track (100).

3. The 3D color printing mechanism according to claim 1, wherein the sliding track (100) includes a motor (110) arranged thereon and used for driving the slider (200).

4. The 3D color printing mechanism according to claim 3, wherein a transmission belt (130) is provided between the motor (110) and the slider (200).

5. The 3D color printing mechanism according to claim 1, wherein a portion of the slider (200) extends to underneath the sliding track (100).

6. The 3D color printing mechanism according to claim 1, wherein the ink jet head (310) and the material squeezer head (410) are arranged to face toward the same direction.

7. The 3D color printing mechanism according to claim 1, wherein the painting nozzle (300) comprises at least one ink cartridge (320), and the ink cartridge (320) is connected to the corresponding ink jet head (310) of the painting nozzle (300).

8. The 3D color printing mechanism according to claim 1, wherein the painting nozzle (300) comprises a plurality of ink jet heads (310), and the plurality of ink jet heads (310) are arranged in one row parallel to the sliding track (100), and the material squeezer head (410) is located inside an arrangement section of the plurality of ink jet heads (310) at a direction parallel to the sliding track (100).

9. The 3D color printing mechanism according to claim 8, wherein the painting nozzle (300) comprises a plurality of ink cartridges (320), and each ink cartridges (320) is connected to the corresponding ink jet head (310) respectively.

\* \* \* \* \*